United States Patent [19]

Dorries et al.

[11] 4,310,355
[45] Jan. 12, 1982

[54] INTERNAL RELEASE AGENT FOR THERMOSETTING AMINOPLAST RESINS

[75] Inventors: Peter Dorries, Frankfurt am Main; Karl-Heinz Keil, Offenbach am Main, both of Fed. Rep. of Germany

[73] Assignee: Cassella Aktiengesellschaft, Frankfurt, Fed. Rep. of Germany

[21] Appl. No.: 188,934

[22] Filed: Sep. 19, 1980

[30] Foreign Application Priority Data

Nov. 30, 1979 [DE] Fed. Rep. of Germany ....... 2948184

[51] Int. Cl.³ .............................................. C09D 5/20
[52] U.S. Cl. ................................. 106/2; 106/287.23; 106/287.29; 260/29.4 UA
[58] Field of Search .................. 106/2, 287.23, 287.29; 206/29.4 UA

[56] References Cited

U.S. PATENT DOCUMENTS 4,243,461  1/1981  Jaisle et al. .............................. 106/2

FOREIGN PATENT DOCUMENTS 550077   12/1957  Canada ..................................... 106/2
51-139127  5/1976  Japan ....................................... 106/2
345182   11/1970  U.S.S.R. ................................... 106/2

Primary Examiner—John Kight, III
Assistant Examiner—Amelia B. Yarbrough
Attorney, Agent, or Firm—Connolly and Hutz

[57] ABSTRACT

An internal release agent and the process of its manufacture aids in releasing thermosetting aminoplast resins from molds and is an aqueous solution or dispersion containing (a) 5-30% by weight of a mixture of 50-100% by weight of a compound of the formula

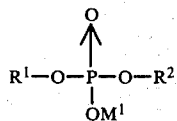

and 0 to 50% by weight of a compound of the formula

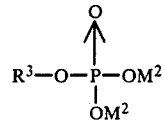

and an acid salt selected from (b), (c) and (d) wherein (b) is 2-15% by weight of a compound of the formula

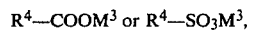

(c) is 0.5 to 10% by weight of a compound of the formula

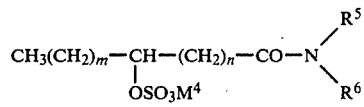

and
(d) is a mixture of (b) and (c);

wherein $R^1$, $R^2$ and $R^3$ independently of one another are straight-chain or branched alkyl or alkenyl having 5 to 12 carbon atoms or phenalkyl or naphthalkyl having 7 to 13 carbon atoms;

$R^4$ is alkyl having 10 to 22 carbon atoms, alkylphenyl or alkylnaphthyl having 1 to 12 carbon atoms in the alkyl chain or a moiety of the formula

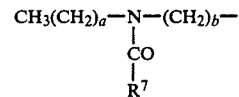

wherein a is a number from 0 to 2, b is a number from 1 to 3 and the sum of a and b is a number from 1 to 3;

$R^5$ is alkyl or alkenyl having 1 to 8 carbon atoms, phenyl, alkylphenyl or phenalkyl with each having 1 to 4 carbon atoms in the alkyl chain;

$R^6$ is hydrogen, alkyl or alkenyl having 1 to 8 carbon atoms, phenyl, alkylphenyl or phenalkyl with each having 1 to 4 carbon atoms in the alkyl chain;

$R^7$ is alkyl having 11 to 20 carbon atoms;

$M^1$, $M^2$, $M^3$ and $M^4$ are identical or different and are an alkali metal cation, ammonium or amine cation, and one of the two $M^2$'s additionally also may be hydrogen;

and m and n independently of one another are numbers from 6 to 8.

8 Claims, No Drawings

INTERNAL RELEASE AGENT FOR THERMOSETTING AMINOPLAST RESINS

The present invention relates to an internal release agent for aminoplast resins which consists of an aqueous solution or dispersion of phosphoric acid esters of the formulae Ia and Ib

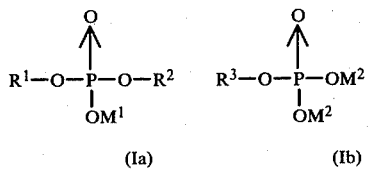

(Ia) (Ib)

and carboxylic acid salts or sulphonic acid salts of the formulae IIa or IIb

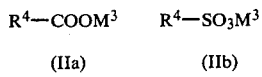

(IIa) (IIb)

and/or sulphuric acid half-esters of hydroxycarboxamides, of the formula III

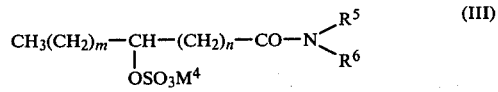

(III)

formulations of this release agent which are stabilised with an emulsifier, and its preparation and use.

Aminoplast resins in the context of the following description are mono-molecular or low-molecular condensation products of so-called aminoplast-forming agents with a carbonyl compound and, if appropriate, a lower alkanol (compare Ullmanns Enzyklopädie der technischen Chemie (Ullmann's Encyclopaedia of Industrial Chemistry), 4th edition, volume 7, (1974), pages 403–424). Examples of aminoplast-forming agents which can be used for the preparation of aminoplast resins are melamine/urea/dicyandiamide, thiourea, substituted melamines, acetoguanamine, butyroguanamine, benzoguanamine and ethylene-urea. Aminoplast resins which are preferred in practice are obtained using melamine and/or urea as the aminoplast-forming agent.

Examples of carbonyl compounds which can be employed for the reaction with the above aminoplast-forming agents are: formaldehyde, acetaldehyde, isobutyraldehyde, acetone, methyl ethyl ketone and diethyl ketone. Formaldehyde is preferred in industry. The aminoplast resins which are the most important in industry are thus obtained by condensation of melamine and/or urea with formaldehyde. Modern aminoplast resins are frequently modified by co-condensation or by subsequent addition of modifying agents to bring about properties which are particularly valuable from an industrial point of view. Examples of known modifying agents are: o- or p-toluenesulphonamide, amidosulphonic acid and salts thereof, caprolactam, glucose, sorbitol, glycol, diglycol, pentaerythritol, sucrose, methylene-bisformamide, methylene-bisacetamide, carbamates, such as, for example, methyl carbamate and methoxyethyl carbamate, and salts of maleamic acid and fumaramic acid.

In the preparation of the aminoplast resins, the condensation reaction between the aminoplast-forming agents and the carbonyl compounds is only carried out to an extent such that the products are still soluble and fusible. The condensation reaction is therefore interrupted in good time, for example by cooling or by establishing a weakly alkaline pH value in the reaction mixture. The aminoplast resins (sometimes also called aminoplast precondensates) thus prepared are used in the form of their aqueous solutions, in particular as impregnated resins for the laminated plastics industry, and for treating the surfaces of chipboard and other derived timber products and for the production of moulding compositions. During processing of the aminoplast resins, these are pressed, in combination with fillers or carriers, under pressure and at elevated temperature. In this operation, there is frequently the difficulty that the pressed product is difficult to remove from the press because adhesion occurs between the surface of the pressed article and the pressing tool. This phenomenon is described in detail in the example of the manufacture of sheet-like pressed products.

Absorbent carriers, such as paper and fabric webs, are impregnated with aminoplast impregnating resins, chiefly melamine/formaldehyde precondensates and melamine/urea/formaldehyde precondensates, and are dried carefully until they are free from tackiness. The carriers treated in this manner are then applied to wood chipboard or hardboard or processed to decorative moulded laminates in hydraulic presses, under the action of pressure and heat. In the pressing operation, the impregnated carrier webs are pressed against a pressing plate, a mirror image of the surface of the pressing plate being obtained on the mobile and curing aminoplast precondensate, as the end product of the finishing operation. Hard chrome-plated brass or steel plates are in general employed as the pressing plates. Two preconditions must be fulfilled in order to obtain reproducible surfaces: an exact image of the surface of the pressing plate must be produced on the mobile resin. This depends, inter alia, on the degree of condensation of the impregnating resin and/or coating resin, the modifying agents regulating the flow of the resin and the nature of the curing agent. A further precondition is that the surface of the pressing plate should not change during the operating period. It is very frequently observed that, especially on the surface of brushed chromium plated or structured pressing plates, residues of resin build up and lead to undesired adhesion phenomena between the impregnated paper and the pressing sheet. This formation of residues is very difficult to control, especially since it occurs sometimes to an increased extent, sometimes to a less marked extent and sometimes not at all or only after very long operating periods. The formation of a deposit on the pressing plate is independent of the pressing temperature and pressing time, that is to say of the curing of the surface of the synthetic resin. In the case of undercuring, it occurs prematurely since particles of resin evidently detach themselves from the surface of the synthetic resin when the pressing is released whilst hot, and adhere to the pressing plate. Moreover, the formation of a deposit is accelerated if the resin flows too freely, in particular as a result of too low a degree of condensation of the resin or of too high a surface residual moisture content in the synthetic resin films. The tolerance range of the degree of condensation, which is in any case narrow, is thus decreased further. The formation of a deposit on the pressing plates and the associated tendency of the shaped articles to adhere to the pressing plates lead to considerable difficulties during release from the mould, with the consequence that the surfaces of the shaped article are damaged or that the contaminations on the press sheet are reproduced thereon. Articles with surfaces damaged in this way, however, can no longer be sold and thus increase the cost of the production quite considerably. In order to avoid this waste, it was thus necessary for any formation of a deposit occurring on the pressing plates to be eliminated as frequently as possible, or at least for the tendency of adhesion between the pressing plate and the pressed article to be reduced. The following processes were customary for this:

1. The surfaces of the plates were washed with detergent solutions which dissolved the residue or with mild cleaning agents which act mechanically. It should be noted, however, that this can lead to chemical and mechanical damage to the surfaces of the pressing plates.
2. The pressing plates were cleaned by a so-called cleansing pressing with specially impregnated paper. Since relatively long pressing times must be maintained in the case of this procedure and the laminate produced is discarded, this method is extremely costly.
3. Attempts have been made to achieve an anti-adhesion effect by spraying release agents onto the surface of the pressing plates. This procedure also cannot be regarded as optimum since non-uniform development of gloss frequently occurs in the case of decorative coatings.

The difficulties mentioned for the pressing processes have also already led to attempts to add special release agents, which reduce the tendency of the articles to adhere to the pressing tools, to the resins themselves. Appropriate statements are found, for example, in "Römpp Chemielexikon" ("Römpp's Chemical Dictionary"), 7th edition (1977), volume 6, page 3,654 and "Kirk-Othmer", 2nd edition, volume 1, pages 1 to 11. The known internal release agents have been employed, above all, for processing thermoplastic materials, such as polystyrene, polyamide, polyethylene or polyvinyl chloride, and in the field of thermosetting polymers in the production of moulded structures from thermosetting polyesters and polyepoxides. However, the classes of substances used for this purpose, which are predominantly derivatives of long-chain alkanecarboxylic acids, for example waxes, stearic acid and salts thereof, and paraffin hydrocarbons, if appropriate in the form of emulsions, were not very suitable or could not be used as mould release agents for the aminoplast precondensates in question, if only because of the completely different physical and physicochemical nature of the materials under comparison.

In the production of shaped pressed articles based on aminoplast pressing compositions, it is customary to add so-called lubricants, which at the same time facilitate the release of the pressed article from the pressing tool (Ullmann, Enzyklopädie der technischen Chemie (Encyclopaedia of Industrial Chemistry), volume 14, page 366, and Kunststoffhandbuch (Plastics Handbook), R. Vieweg and E. Becker, volume 10 (Duroplaste [Duroplasts]), page 346). The agents used here were predominantly stearic acid, stearates and palmitates of zinc, magnesium or calcium and synthetic and naturally occurring waxes. Highly sulphonated castor oil was also employed for specific purposes (Transaction of the Plastics Institute, volume 46 (1953) page 11). The addition of long-chain amides of stearic acid as a lubricant and release agent to aminoplast resins pressing compositions is also known from U.S. Pat. Nos. 2,250,746 and 2,250,747 (1947). However, the activity of these known release agents is too low, especially when they are used in aqueous impregnating resin systems, and at the high amounts which it is therefore frequently necessary to add, they have an adverse effect on the surfaces of the pressed articles, such as matt patches as a result of non-uniform distribution of the auxiliaries and blooming of the additives onto the surface of the shaped articles. Furthermore, they do not yet meet practical requirements with regard to other technological properties, such as compatibility with various types of resin and storability, and also with regard to their cost.

The present invention thus relates to a release agent for aminoplast resins which is considerably superior to the products known hitherto. It consists of an aqueous solution or dispersion containing (a) 5–30% by weight, preferably 10–15% by weight, of a mixture of 50–100% by weight of a compound of the general formula Ia

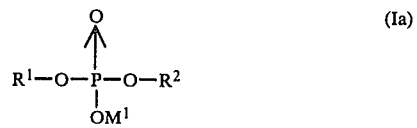

and 0 to 50% by weight of a compound of the general formula Ib

and (b) 2–15% by weight of a compound of the general formula IIa or IIb

and/or (c) 0.5 to 10% by weight of a compound of the general formula III

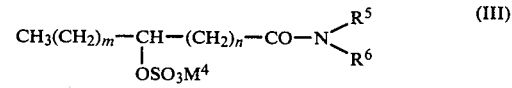

wherein, in the formulae I to III, $R^1$, $R^2$ and $R^3$ independently of one another denote straight-chain or branched alkyl or alkenyl with 5 to 12 C atoms or phenalkyl or naphthalkyl with 7–13 C atoms, $R^4$ denotes alkyl with 10 to 22 C atoms, alkylphenyl or alkylnaphthyl with 1 to 12 C atoms in the alkyl chain or a radical of the formula IV

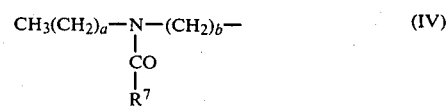

wherein a is a number from 0 to 2, b is a number from 1 to 3 and a+b gives a number from 1 to 3, $R^5$ denotes alkyl or alkenyl with 1 to 8 C atoms, phenyl or alkylphenyl or phenalkyl with in each case 1 to 4 C atoms in the alkyl chain, $R^6$ denotes hydrogen or one of the radicals mentioned for $R^5$, $R^7$ denotes alkyl with 11 to 20 C atoms, $M^1$ to $M^4$ are identical or different and denote an alkali metal cation or a cation equivalent to an alkali metal and one of the two symbols $M^2$ additionally also denotes hydrogen, and m and n independently of one another are numbers from 6 to 8.

The internal release agents according to the invention also contain, in addition to the main active compound, that is to say the phosphoric acid esters of the general formulae Ia and Ib, either a compound of the general formula IIa or IIb or a compound of the general formula III, or they contain both compounds of the formula IIa or IIb and those of the formula III.

The interaction of these constituents imparts particularly advantageous technological properties to the agents according to the invention and increases their scope of application.

Preferred release agents according to the invention contain 10 to 15% by weight of a mixture of the compounds of the formulae Ia and Ib and, if they contain compounds of the general formula IIa or IIb, 5 to 10% by weight thereof, and, if they contain compounds of the general formula III, 0.5 to 5% by weight thereof.

Possible alkyl or alkenyl radicals $R^1$, $R^2$ and $R^3$ are the normal or isomeric pentyl, hexyl, heptyl, octyl, nonyl, decyl, undecyl and dodecyl radicals or pentenyl, hexenyl, heptenyl, octenyl, nonenyl, decenyl, undecenyl and dodecenyl radicals. Phenalkyl or naphthalkyl with 7 to 13 C atoms, which $R^1$, $R^2$ and $R^3$ can represent, are: benzyl, phenethyl, phenylpropyl, phenylbutyl, phenylpentyl, phenylhexyl and phenylheptyl, or naphthylmethyl, naphthylethyl and naphthylpropyl. Unbranched alkyl radicals, or those with at most 1 branch, and benzyl, phenethyl, phenylpropyl, naphthylmethyl and naphthylethyl are preferred for $R^1$, $R^2$ and $R^3$.

Alkyl radicals $R^4$ with 10–22 C atoms are the decyl, undecyl, dodecyl, tridecyl, tetradecyl, pentadecyl, hexadecyl, heptadecyl, octadecyl, nonadecyl, eicosyl, heneicosyl and docosyl radicals, the radicals with 14, 16 and 18 C atoms being preferred. Preferred constituents of the release agents according to the invention are also those compounds of the formula III in which $R^4$ is a mixture of alkyl radicals of naturally occurring composition, such as, for example, naturally occurring stearyl, tallow alkyl or palm-kernel alkyl. $R^4$ can also be a radical of the formula IV

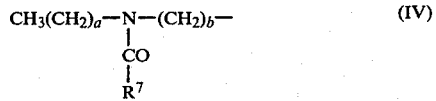

that is to say an alkyl radical which has 2–4 C atoms and in which the chain is interrupted by a $NCOR^7$ group. In this case, $R^7$ denotes alkyl with 11–20 C atoms, alkyl radicals with 13, 15 and 17 C atoms and the naturally occurring abovementioned mixtures of alkyl radicals being preferred.

$R^5$ denotes alkyl or alkenyl with 1 to 8, preferably 1 to 4, C atoms, phenyl or alkylphenyl or phenalkyl with in each case 1 to 4 C atoms in the alkyl chain.

Examples of alkyl radicals which $R^5$ can represent are methyl, ethyl, propyl, isopropyl, but-1-yl, but-2-yl, isobutyl, ter.-butyl, pentyl, hexyl, heptyl, octyl and isooctyl. Examples of alkenyl radicals which $R^5$ can represent are vinyl, allyl, methallyl and crotyl.

Alkyl radicals with 1–4 C atoms and alkenyl radicals with 3 or 4 C atoms are preferred for $R^5$. $R^6$ has the same meanings as $R^5$, but can additionally be a hydrogen atom.

$R^7$ represents an alkyl radical with 11–20 C atoms. Examples of such alkyl radicals are the undecyl, dodecyl, tridecyl, tetradecyl, pentadecyl, hexadecyl, heptadecyl, octadecyl, nonadecyl and eicosyl radicals, the radicals with 14, 16 and 18 C atoms being preferred.

Mixtures of alkyl radicals of naturally occurring composition, such as, for example, naturally occurring stearyl, tallow alkyl or palm-kernel alkyl, are also preferred for $R^7$.

The symbols $M^1$ to $M^4$ represent alkali metal cations or cations equivalent to an alkali metal. Examples of alkali metal cations are lithium, sodium and potassium ions; examples of cations which are equivalent to an alkali metal are the proton adducts of ammonia and organic amines, organic amines which may be mentioned being hydroxyalkylamines, such as, for example, mono-, di- and tri-ethanolamine, and cyclic amines, such as, for example, pyrrolidine, piperidine and, preferably, morpholine.

a is a number from 0 to 2, b is a number from 1 to 3 and a and b are chosen such that their sum is a number from 1 to 3.

m and n independently of one another are numbers from 6 to 8. Those compounds of the general formula III in which the numbers represented by m and n give a sum of 15 are preferred as constituents of the internal release agents according to the invention.

In addition to their outstanding activity, the release agents according to the invention have a compatibility with aminoplast resins which is exceptionally advantageous from an industrial point of view, even when these aminoplast resins contain the most diverse known modifying agents. There is also an excellent compatibility between the release agents according to the invention and known emulsifiers. This property can be utilised in a very advantageous manner to increase substantially the stability of resin/release agent formulations both in the high resin concentrations present during the preparation of the resins and in the lower resin concentrations in the ready-to-use impregnating bath. It is therefore possible for the release agents and emulsifiers already to be added immediately after the preparation, before despatch of the impregnating resins, so that the user has no further problems at all with the preparation of the impregnating liquors. Emulsifiers of the formula V

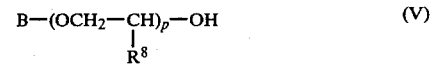

are particularly advantageous for the use according to the invention. In this formula, B denotes alkylphenyl with 9–18 C atoms in the alkyl radicals, naphthyl, hydroxydiphenyl or benzyl- or phenethyl-diphenyl. $R^8$ represents hydrogen or methyl and p is a number from 5 to 25. Preferably, B is 4-nonylphenyl, 2,4-dinonylphenyl, 2,4,6-tri-n-butylphenyl, 2,4,6-tri-iso-butylphenyl, 2,4,6-tri-tert.-butylphenyl, 4-dodecylphenyl, naphthyl, 2'-phenethyldiphenyl, 2'-benzyldiphenyl and 4'-benzyldiphenyl and p is a number from 5 to 15.

The compounds of the general formula Ia are salts of o-phosphoric acid di-alkyl esters, and the compounds of the general formula Ib are salts of o-phosphoric acid mono-alkyl esters. As already mentioned above, the proportion of compounds of the formula Ia in the mixture is between 50 and 100 percent by weight, and is preferably 60 to 80 percent by weight. It is of particular advantage here that crude technical grade o-phosphoric acid ester mixtures which contain at least 50% of the diester can be used as mixtures of the formula Ia and Ib. Those technical grade phosphoric acid esters in which $R^1=R^2=R^3$ and $M^1=M^2$ are preferred for the preparation of the release agents according to the invention. These technical grade products may also additionally contain up to 15 percent by weight of the alkanol $R^1OH$ used for the esterification; this does not interfere with the preparation of the internal release agents according to the invention.

If the internal release agents according to the invention are to be added to the aminoplast impregnating resins only by the processor, it is particularly appropriate, and simplifies the use to an extremely great extent, for the internal release agents with the active compounds (a), (b) and, if appropriate, (c) to be combined with the emulsifier, preferably one of those of the formula IV, from the beginning. Such release agent formulations are outstandingly stable and are exceptionally simple to distribute in the aminoplast resin.

Because of the particularly high activity of the release agents according to the invention, 0.05 to 2.5% by weight, relative to a 40 to 50% strength impregnating resin solution, are as a rule completely sufficient to ensure perfect release of the pressed article from the pressing tool. The amounts of the agent according to the invention added are usually, that is to say in the case of normally adhesive resins, predominantly in the lower part of the range indicated, in particular between 0.05 and 0.5% by weight. Even in resins which have a marked tendency towards adhesion and to which amounts in the upper part of the range indicated are added, no impairment of the pressed articles by inhomogeneities on the surface is observed because of the outstanding stability of the release agents according to the invention in the impregnating liquor and the outstanding uniform distribution. The internal release agents according to the invention are considerably superior to the products known hitherto, especially with regard to these aspects, that is to say high activity, in other words low use concentrations in the normal case, and outstanding compatibility in the case where relatively high concentrations of release agents are required.

To prepare in each case 100 parts by weight of the internal release agent according to the invention, (a) 5–30 parts by weight, preferably 10–15 parts by weight, of a mixture of 50–100% by weight of a compound of the general formula Ia

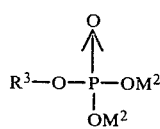

and 0 to 50% by weight of a compound of the general formula Ib

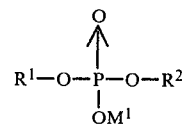

and (b) 2–15 parts by weight, preferably 5–10 parts by weight, of a compound of the general formula IIa or IIb

and/or (c) 0.5 to 10 parts by weight, preferably 0.5 to 5 parts by weight, of a compound of the general formula III

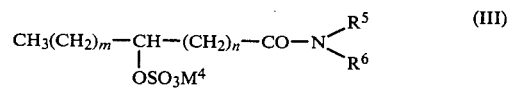

wherein, in the formulae I to III, the radicals $R^1$, $R^2$, $R^3$, $R^4$, $R^5$ and $R^6$ and $M^1$ to $M^4$, m and n have the abovementioned meanings, are homogenised with the amount of water required to make these constituents up to 100 parts by weight.

In the case where a preferred emulsifier-containing release agent formulation according to the invention is to be prepared, up to 10 parts by weight of a non-ionic dispersing agent of the general formula V

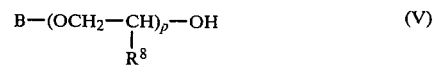

wherein B, $R^8$ and p have the abovementioned meanings, are additionally incorporated into the formulation, the amount of water being appropriately reduced.

The constituents of the internal release agents according to the invention are homogenised in a manner which is in itself customary. For example, to prepare preferred emulsifier-containing release agent formulations, a procedure is followed in which a mixture of the required amount of water and emulsifier is first homogenised by high-speed stirring at temperatures between 20° and 80° C., and the remaining constituents of the formulation are gradually added to this emulsifier/water mixture, with continuous, vigorous, thorough mixing.

The active compound components and emulsifiers, of the formulae I to IV, required for the preparation of the release agent formulations according to the invention are known in principle, and they are prepared by known processes. Many of them are familiar commercial products.

The following embodiment examples illustrate the invention and its use and demonstrate the valuable industrial properties of the release agents according to the invention.

All the percentage data relate to the weight; the Kiton test mentioned repeatedly in the examples is carried out on laminates as follows: half of the material to be tested is introduced, for 10 minutes, into a boiling solution of the following composition: 1 liter of water, 5 ml of concentrated sulphuric acid and 1 ml of a 2% strength aqueous solution of Acid Red 45 (C.I.). The degree of coloration is then compared with a six-stage scale, according to which stage 1 has no coloration and stage 6 has a considerable degree of coloration. Stage 1 denotes perfect curing and stage 6 is to be attributed to insufficient curing.

The Kiton test is carried out on coated chipboard as follows:

1 ml of a solution of the following composition: 20 ml of concentrated sulphuric acid and 20 ml of a 2% strength aqueous solution of Acid Red 45 (C.I.) is applied to the surface to be tested, and is covered with a watch glass. After 2 hours, the degree of coloration is assessed using the abovementioned six-stage scale.

EXAMPLE 1

7.2 parts by weight of the morpholine salt of di-2-ethylhexyl phosphate, 4.8 parts by weight of the morpholine salt of mono-2-ethylhexyl phosphate, 6 parts by weight of the morpholine salt of lauric acid and 10 parts by weight of a compound of the formula

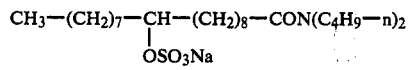

are introduced into 72 parts by weight of water at 50° C., whilst continuously stirring vigorously, and the mixture is subsequently stirred for 15 minutes and then cooled to room temperature, whilst stirring.

The resulting release agent according to the invention is employed in the use examples.

Its addition to the resin leads to no reduction in the life.

The 7.2 parts by weight of the morpholine salt of di-2-ethylhexyl phosphate and 4.8 parts of the morpholine salt of mono-2-ethylhexyl phosphate employed above can also be in the form of a mixture and can be dissolved together.

EXAMPLE 2

15 parts by weight of the diglycolamine salt* of di-benzyl phosphate and 5 parts by weight of the diglycolamine salt of mono-benzyl phosphate, individually or as a mixture, are dissolved in 65 ml of water, and 10 parts by weight of the diglycolamine salt of lauric acid and 5 parts by weight of a compound of the formula

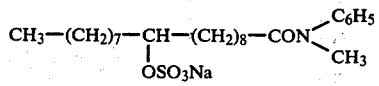

are added, and the mixture is subsequently stirred at 50° C. for 15 minutes and then cooled to room temperature, whilst stirring.
*The abbreviation "diglycolamine" is used here and in the following text for β-(β-hydroxyethoxy)-ethylamine.

The resulting release agent according to the invention is employed in the use examples. Its addition to the resin leads to no reduction in the life.

EXAMPLE 3

5 parts by weight of an oxyethylation product of 4-nonylphenol and 10 mols of ethylene oxide are introduced into 82 ml of water at 40° C., whilst stirring vigorously, and the mixture is stirred until it is completely homogeneous. A mixture of 7 parts by weight of the morpholine salt of di-2-ethylhexyl phosphate and 3 parts by weight of the morpholine salt of mono-2-ethyl-hexyl phosphate is then introduced at the same temperature, whilst homogenising, and 2 parts by weight of the morpholine salt of N-methyl-N-oleyl-aminoacetic acid and 1 part by weight of a compound of the formula

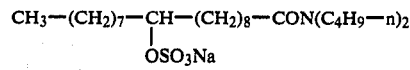

are subsequently added. The mixture is then stirred at 40° C. for 15 minutes and thereafter is allowed to cool gradually to room temperature, whilst stirring.

The release agent thus obtained is employed in a manner analogous to that in the use examples.

The resins to which it is added have a very good life and exhibit a greatly reduced tendency towards adhesion during processing.

The release agent formulations according to the invention which are given in Table 1 which follows can also be prepared analogously to Examples 1 to 3. In this table, the abbreviations for the individual components have the following meanings:

A 1: the morpholine salt of di-2-ethylhexyl phosphate
A 2: the morpholine salt of mono-2-ethylhexyl phosphate
A 3: the morpholine salt of lauric acid
A 4:

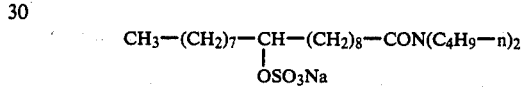

B 1: the diglycolamine salt of di-benzyl phosphate
B 2: the diglycolamine salt of mono-benzyl phosphate
B 3: the diglycolamine salt of lauric acid
B 4:

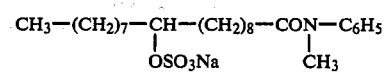

C 1: the morpholine salt of di-isodecyl phosphate
C 2: the morpholine salt of mono-isodecyl phosphate
C 3: the morpholine salt of n-dodecylbenzenesulphonic acid
C 4:

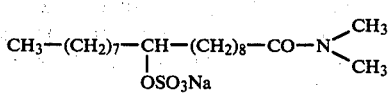

D 1: the morpholine salt of di-2-ethylhexyl phosphate
D 2: the morpholine salt of mono-2-ethylhexyl phosphate
D 3: the morpholine salt of N-methyl-N-oleyl-aminoacetic acid
D 4:

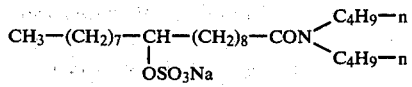

D 5: 4-nonylphenol + 10 mols of ethylene oxide
E 1: the diglycolamine salt of di-2-ethylhexyl phosphate E 2: the diglycolamine salt of mono-2-ethylhexyl phosphate
E 3: the diglycolamine salt of β-N-methyl-N-stearoyl-aminoethanesulphonic acid
E 4:

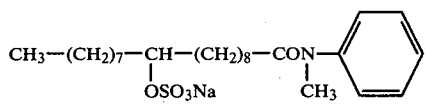

E 5: 2,4,6-tri-tert.-butyl-phenol + 11 mols of ethylene oxide
F 1: the morpholine salt of di-iso-nonyl phosphate
F 2: the morpholine salt of mono-iso-nonyl phosphate
F 3: the morpholine salt of β-N-methyl-N-oleyl-aminoethanesulphonic acid
F 4:

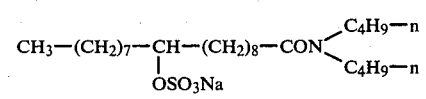

F 5: 2,4-dinonylphenol + 17 mols of ethylene oxide
G 1: the morpholine salt of di-2-ethylhexyl phosphate
G 2: the morpholine salt of mono-2-ethylhexyl phosphate
G 3: the morpholine salt of 4-methyl-benzenesulphonic acid
G 4: 4-nonylphenol + 15 mols of ethylene oxide
H 1: the diglycolamine salt of di-benzyl phosphate
H 2: the diglycolamine salt of mono-benzyl phosphate
H 3:

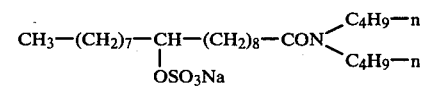

H 4: 4-nonylphenol + 23 mols of ethylene oxide
J 1: the triethanolamine salt of di-2-ethylhexyl phosphate
J 2: the triethanolamine salt of mono-2-ethylhexyl phosphate
J 3: the triethanolamine salt of lauric acid
J 4: 4-nonylphenol + 15 mols of ethylene oxide
K 1: the morpholine salt of di-2-isononyl phosphate
K 2: the morpholine salt of mono-2-ethylhexyl phosphate
K 3: the morpholine salt of n-dodecylbenzenesulphonic acid
K 4: 2,4,6-tri-tert.-butylphenol + 20 mols of ethylene oxide
L 1: the potassium salt of di-benzyl phosphate
L 2: the potassium salt of mono-benzyl phosphate
L 3: the potassium salt of 4-methylbenzenesulphonic acid
L 4: 4-nonylphenol + 10 mols of ethylene oxide In the "stability" column, + denotes a storage life of about 4 weeks at 20° C. and of about 3 weeks at 30° C.

In the "action" column, + + denotes no tendency to stick after 30 pressings when 0.5% of the formulation in question is added to the resin.

TABLE 1

| Example No. | Formulation component | Concentration % | Stable resin solution | Action |
|---|---|---|---|---|
| 4 | A 1 | 7.2 | | |
| | A 2 | 4.8 | + | + + |
| | A 4 | 10 | | |
| 5 | A 1 | 20 | | |
| | A 2 | — | + | + + |
| | A 3 | 5 | | |
| | A 4 | 2 | | |
| 6 | A 1 | 10 | | |
| | A 2 | 2 | + | + + |
| | A 3 | 10 | | |
| 7 | A 1 | 5 | | |
| | A 2 | 5 | + | + + |
| | A 3 | 6 | | |
| 8 | A 1 | 10 | | |
| | A 2 | 5 | + | + + |
| | A 3 | 7 | | |
| | A 4 | 8 | | |
| 9 | B 1 | 10 | | |
| | B 2 | 7 | | |
| | B 3 | 0 | + | + + |
| | B 4 | 1 | | |
| 10 | C 1 | 10 | | |
| | C 2 | 2 | + | + + |
| | C 3 | 15 | | |
| | C 4 | 1 | | |
| 11 | C 1 | 15 | | |
| | C 2 | 15 | + | + + |
| | C 3 | 15 | | |
| | C 4 | 10 | | |
| 12 | D 1 | 10 | | |
| | D 2 | 7 | | |
| | D 3 | 0 | + | + + |
| | D 4 | 1 | | |
| | D 5 | 0 | | |
| 13 | E 1 | 16 | | |
| | E 2 | 0 | | |
| | E 3 | 2 | + | + + |
| | E 4 | 1 | | |
| | E 5 | 4 | | |
| 14 | E 1 | 10 | | |
| | E 2 | 1 | | |
| | E 3 | 3 | + | + + |
| | E 4 | 10 | | |
| | E 5 | 0 | | |
| 15 | F 1 | 7 | | |
| | F 2 | 5 | | |
| | F 3 | 6 | + | + + |
| | F 4 | 10 | | |
| | F 5 | 0 | | |
| 16 | F 1 | 5 | | |
| | F 2 | 3 | | |
| | F 3 | 3 | + | + + |
| | F 4 | 3 | | |
| | F 5 | 2 | | |
| 17 | G 1 | 15 | | |
| | G 2 | 5 | | |
| | G 3 | 2 | + | + + |
| | G 4 | 1 | | |
| 18 | G 1 | 10 | | |
| | G 2 | 3 | | |
| | G 3 | 4 | + | + + |
| | G 4 | 10 | | |
| 19 | H 1 | 8 | | |
| | H 2 | 4 | | |
| | H 3 | 5 | + | + + |
| | H 4 | 5 | | |
| 20 | H 1 | 10 | | |
| | H 2 | 10 | + | + + |
| | H 3 | 1 | | |
| | H 4 | 10 | | |
| 21 | J 1 | 20 | | |
| | J 2 | 0 | + | + + |
| | J 3 | 4 | | |
| | J 4 | 1 | | |
| 22 | J 1 | 5 | | |
| | J 2 | 5 | + | + + |
| | J 3 | 5 | | |
| | J 4 | 5 | | |

TABLE 1-continued

| Example No. | Formulation component | Concentration % | Stable resin solution | Action |
|---|---|---|---|---|
| 23 | K 1 | 20 | | |
| | K 2 | 0 | + | ++ |
| | K 3 | 4 | | |
| | K 4 | 0 | | |
| 24 | K 1 | 10 | | |
| | K 2 | 5 | + | ++ |
| | K 3 | 1 | | |
| | K 4 | 2 | | |
| 25 | L 1 | 8 | | |
| | L 2 | 4 | + | ++ |
| | L 3 | 5 | | |
| | L 4 | 10 | | |
| 26 | L 1 | 10 | | |
| | L 2 | 3 | + | ++ |
| | L 3 | 5 | | |
| | L 4 | 1 | | |

USE EXAMPLE A 1

0.5% of a curing accelerator based on morpholine p-toluenesulphonate is added to a solution of a modified melamine resin prepared in the customary manner in a molar ratio of melamine to formaldehyde of 1:1.8 and with a solids content of about 55% and a water-dilutability of 1:1.5, and the mixture is formulated to give a gelling time (140° C. in a pressure tube) of 70–80 seconds.

The solution of melamine impregnating resin is then divided into 9 samples, 0.1% by weight, 0.25% by weight, 0.5% by weight and 1% by weight of the release agent according to Example 1 being added to samples 1 to 4 and 0.1% by weight, 0.25% by weight, 0.5% by weight and 1% by weight of the release agent according to Example 2 being added to samples 5 to 8.

Sample 9 is left as a comparison sample, without the addition of a release agent.

A printed, absorbent decorative paper ("light pine") with a raw weight of 80 g/m² is impregnated with the resin solutions such that the carrier web has a weight per unit area of 185–195 g/m² and a residual moisture content of 6–7%.

The paper is pressed onto chipboard weighing about 680 kg/m³ in a one-daylight press under the following so-called short-cycle conditions.

Contact time elapsing before the full pressure is reached: about 5 seconds; pressing time: 38 seconds; pressing temperature, measured on the impregnated film: about 148° C.; pressure: about 20 bars. No recooling takes place before the release from the press.

The pressing plate used is (a) a structured hard chrome-plated brass plate and (b) a dull matt chrome-plated stainless steel plate. The ease with which the coated chipboard is released from the pressing plate and the degree of curing of the surface of the plate are tested, the latter by the method of the Kiton test. The attack by acid and absorption of dyestuff after a testing period of 2 hours are evaluated with the aid of a six-stage evaluation scale from 1 to 6, stage 1 denoting "no attack". A coloration stage 2 "slight coloration", which corresponds to an optimum degree of curing, that is to say no overcuring, is established for Examples 1 to 9.

Results:
1. Structured brass plate
1.1 Release agent according to Example 1

| Amounts added: | Evaluation of the tendency to adhere to the pressing plate: |
|---|---|
| 0.1% | slight tendency to adhere after 20 pressings, distinct tendency to adhere after 30 pressings |
| 0.25% | slight tendency to adhere after 30 pressings |
| 0.5% | no adhesion even after 30 pressings |
| 1.0% | |

1.2 Release agent according to Example 2

| Amounts added: | Evaluation of the tendency to adhere to the pressing plate: |
|---|---|
| 0.1% | |
| 0.25% | evaluation as under 1.1 |
| 0.5% | |
| 1.0% | |

1.3 Comparison sample without a release agent:
slight tendency to adhere after 8–10 pressings, distinct tendency to adhere after 12 pressings 2. Chrome-plated stainless steel plate
2.1 Release agent according to Example 1

| Amounts added: | Evaluation of the tendency to adhere to the pressing plate |
|---|---|
| 0.1% | slight to distinct tendency to adhere after 12 pressings |
| 0.25% | slight to distinct tendency to adhere after 25 pressings |
| 0.5% | no tendency to adhere after 30 pressings |
| 1.0% | |

2.2. Release agent according to Example 2

| Amounts added: | Evaluation of the tendency to adhere to the pressing plate |
|---|---|
| 0.1% | |
| 0.25% | evaluation as under 2.1 |
| 0.5% | |
| 1.0% | |

2.3. Comparison sample without a release agent
distinct tendency to adhere after 5 pressings

USE EXAMPLE A 2

70 parts by weight of the modified melamine impregnating resin already described are mixed with 30 parts by weight of a commercially available urea/formaldehyde impregnating resin (solids content about 50%), 0.7% of a curing accelerator based on morpholine p-toluenesulphonate is added and the mixture is formulated to give a gelling time (at 140° C. in a pressure tube) of 70–80 seconds. This impregnating resin solution is then divided into 3 samples, 0.25% by weight and 0.5% by weight of the release agent according to Example 1 being added to samples 1 and 2. Sample 3 is left as a comparison sample without the addition of a release agent. White, pigmented, absorbent paper produced from alpha-pulp and having a raw weight of about 100 g/m² is impregnated with the resin solutions such that the carrier web has a weight per unit area of 230 to 240 g/m² and a residual moisture content of 6–7%.

The paper is pressed onto chipboard weighing about 680 kg/m³ in a one-daylight press under the following so-called short-cycle conditions.

Contact time elapsing before the full pressure is reached: about 5 seconds; pressing time: 38 seconds; pressing temperature, measured on the impregnated film: about 148° C.; pressure: about 20 bars. No recooling takes place before the release from the press.

The pressing plate used is (a) a structured hard chrome-plated brass plate and (b) a dull matt chrome-plated stainless steel plate. The ease with which the coated chipboard is released from the pressing plate and the degree of curing of the surface of the plate are tested, the latter by the method of the Kiton test.

The coloration stage 2 "slight coloration", corresponding to the optimum degree of curing, that is to say no over-curing, is also established in this case, as in the case of Use Example A 1.

Results:

1. Structured brass pressing plate

| Amount added: | Evaluation of the tendency to adhere to the pressing plate |
|---|---|
| 0.25% | slight tendency to adhere after 15 pressings |
| 0.5% | no tendency to adhere after 30 pressings |
| Comparison sample without a release agent: | distinct tendency to adhere after 5 pressings |

2. Chrome-plated stainless steel pressing plate

| Amount added: | Evaluation of the tendency to adhere to the pressing plate |
|---|---|
| 0.25% | slight tendency to adhere after 15 pressings |
| 0.5% | no tendency to adhere after 30 pressings |
| Comparison sample without a release agent: | distinct tendency to adhere after 5 pressings |

What is claimed:

1. Internal release agent for thermosetting aminoplast resins which is an aqueous solution or dispersion containing
   (a) 5–30% by weight of a mixture of 50–100% by weight of a compound of the formula

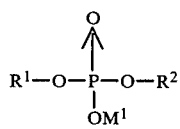

and 0 to 50% by weight of a compound of the formula

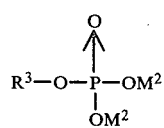

and an acid salt selected from (b), (c) and (d) wherein (b) is 2–15% by weight of a compound of the formula

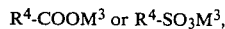

(c) is 0.5 to 10% by weight of a compound of the formula

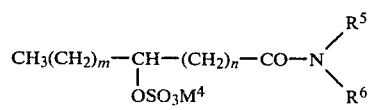

and (d) is a mixture of (b) and (c);
wherein
$R^1$, $R^2$ and $R^3$ independently of one another are straight-chain or branched alkyl or alkenyl having 5 to 12 carbon atoms or phenalkyl or naphthalkyl having 7 to 13 carbon atoms;

$R^4$ is alkyl having 10 to 22 carbon atoms, alkylphenyl or alkylnaphthyl having 1 to 12 carbon atoms in the alkyl chain or a moiety of the formula

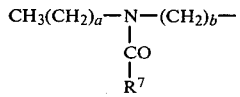

wherein a is a number from 0 to 2, b is a number from 1 to 3 and the sum of a and b is a number from 1 to 3;

$R^5$ is alkyl or alkenyl having 1 to 8 carbon atoms, phenyl, alkylphenyl or phenalkyl with each having 1 to 4 carbon atoms in the alkyl chain;

$R^6$ is hydrogen, alkyl or alkenyl having 1 to 8 carbon atoms, phenyl, alkylphenyl or phenalkyl with each having 1 to 4 carbon atoms in the alkyl chain;

$R^7$ is alkyl having 11 to 20 carbon atoms;

$M^1$, $M^2$, $M^3$ and $M^4$ are identical or different and are an alkali metal cation, ammonium or amine cation, and one of the two $M^2$'s additionally also may be hydrogen;

and m and n independently of one another are numbers from 6 to 8.

2. Internal release agent according to claim 1 wherein the solution or dispersion additionally contains 1 to 10% by weight of a non-ionic dispersing agent of the formula

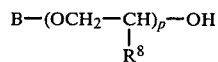

wherein B is alkylphenyl having 9 to 18 carbon atoms in the alkyl moiety, naphthyl, hydroxydiphenyl, benzyldiphenyl or phenethyl-diphenyl; $R^8$ is hydrogen or methyl and p is a number from 5 to 25.

3. Internal release agent according to claim 1 containing 10 to 15% by weight of a mixture of the compounds of component (a).

4. Internal release agent according to claim 1 containing 5–10% by weight of component (b).

5. Internal release agent according to claim 4 which also contains 0.5 to 5% by weight of component (c).

6. Internal release agent according to claim 5 wherein the sum of m and n is component (c) is 15.

7. The process for preparation of an internal release agent for thermosetting aminoplast resins as defined in claim 1 comprising homogenizing components (a) and one selected from (b), (c) and (d) in sufficient water to make up 100 parts by weight of said agent which contains:
   (a) 5–30 parts by weight of a mixture of 50–100% by weight of a compound of the formula

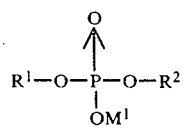

and 0 to 50% by weight of a compound of the formula

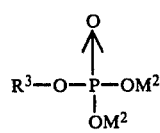

and an acid salt selected from (b), (c) and (d) wherein (b) is 2–15 parts by weight of a compound of the formula $$R^4\text{-}COOM^3 \text{ or } R^4SO_3M^3,$$

(c) is 0.5 to 10 parts by weight of a compound of the formula

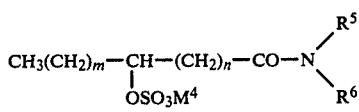

and (d) is a mixture of (b) and (c);

wherein $R^1$, $R^2$ and $R^3$ independently of one another are straight-chain or branched alkyl or alkenyl having 5 to 12 carbon atoms or phenalkyl or naphthalkyl having 7 to 13 carbon atoms;

$R^4$ is alkyl having 10 to 22 carbon atoms, alkylphenyl or alkylnaphthyl having 1 to 12 carbon atoms in the alkyl chain or a moiety of the formula

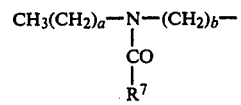

wherein a is a number from 0 to 2, b is a number from 1 to 3 and the sum of a and b is a number from 1 to 3;

$R^5$ is alkyl or alkenyl having 1 to 8 carbon atoms, phenyl, alkylphenyl or phenylalkyl with each having 1 to 4 carbon atoms in the alkyl chain;

$R^6$ is hydrogen, alkyl or alkenyl having 1 to 8 carbon atoms, phenyl, alkylphenyl or phenalkyl with each having 1 to 4 carbon atoms in the alkyl chain;

$R^7$ is alkyl having 11 to 20 carbon atoms;

$M^1$, $M^2$, $M^3$ and $M^4$ are identical or different and are an alkali metal, ammonium or amine cation, and one of the two $M^2$'s additionally also may be hydrogen;

and m and n independently of one another are numbers from 6 to 8.

8. The process according to claim 7 wherein component (a) and one selected from (b), (c) and (d) are homogenized with 1 to 10 parts by weight of a non-ionic dispersing agent of the formula

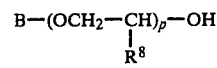

in sufficient water to make up 100 parts by weight of said agent, wherein B is alkylphenyl having 9 to 18 carbon atoms in the alkyl moiety, naphthyl, hydroxydiphenyl, benzyl-diphenyl or phenethyl-diphenyl;

$R^8$ is hydrogen or methyl and p is a number from 5 to 25.

* * * * *